United States Patent
Truxillo

[15] 3,689,968
[45] Sept. 12, 1972

[54] METHOD OF ALIGNING BEARINGS OF SHAFTING SYSTEMS

[72] Inventor: Ruffin G. Truxillo, New Orleans, La. 70118

[73] Assignee: Tru-Line, Inc., New Orleans, La.

[22] Filed: March 15, 1971

[21] Appl. No.: 124,555

[52] U.S. Cl. ............................................27/149.5 R
[51] Int. Cl. ............................................B23p 11/00
[58] Field of Search.......29/149.5 R, 407, 149.5 NM, 29/149.5 PM

[56] References Cited

UNITED STATES PATENTS

| | | | |
|---|---|---|---|
| 2,180,282 | 11/1939 | Leighton | 29/149.5 R |
| 2,446,515 | 8/1948 | Weingart | 29/149.5 R |

*Primary Examiner*—Thomas H. Eager
*Attorney*—James B. Lake, Jr.

[57] ABSTRACT

Bearing support sleeves or bearings are aligned by any well known procedures and held by temporary holding means in their respective permanent support fittings fixed to a basic structure, said support fittings having annular openings large enough to easily receive the sleeves or bearings therein with annular space left therebetween. The annular space is then filled with a high strength casting material that is allowed to setup before the holding means are removed or left severed in place to leave the support sleeves or bearings permanently aligned and fixed in place relative to each other.

2 Claims, No Drawings

METHOD OF ALIGNING BEARINGS OF SHAFTING SYSTEMS

The invention relates generally to an improved method of aligning bearings of shafting systems, and more particularly of aligning bearings of ships' propeller shafts.

Heretofore the bearings of shafts have been aligned by shop boring their fittings, or in some cases the bearings themselves, and then welding or otherwise securing to a base or a ship's structure. The securing process, however, even under the best precision conditions, more often than not is a cause of misalignment between bearings. If the resulting misaligment exceeds the allowable limits the welds or other securing means must be cut and the parts refastened or welded in a trial and error procedure. Alternatively, the bearing supports may be fastened in place and then bored with a portable drilling apparatus that normally is not able to equal the tolerances obtained with shop apparatus.

In both the above described old methods, it is not possible to align the support bearings while the drive shaft is in place which is often desirable. It is also desirable to align the bearings and/or their supports in a ship while the ship is afloat. Presently neither of the above practices are possible practically with the described old methods of alignment, especially where the bearing supports or some of them are outside the ship's structure.

It is an object of the invention to provide a method of aligning bearings and bearing supports that have been accurately shop bored for all shafts requiring a plurality of supports, and especially bearing supports for propeller shafts in ships.

Another object of the invention is to provided a method of aligning bearing supports with the supported shaft in place in the bearings, and in the case of a ship with the ship afloat also.

Other objects and a more complete understanding may be had by referring to the following specifications and claims, and with reference to a ship.

In the preferred practice of the invention, a thin sleeve is shop machined interiorly to close tolerances. Support fittings that are made with annular passages larger than the outside dimensions of the sleeve and they are fastened to the base structure in approximate alignment. Heretofore the annular passages have been made smaller than the bearings they are to support and bored or machined either in place or in the shop.

The sleeves are positioned and held in the fittings by jacks or other similar and convenient means and are aligned with reference to a line of sight, or a base line as designated by the designers, and if a ship while the ship is in drydock. With a ship afloat, the sleeves are held in the fittings as in drydock and are aligned by instrumentation, that is by instruments adapted to sense and indicate the forces at each bearing. This procedure can be followed with the shaft lying in the bearings and the static loads thereon reduced to an optimum set by the designer by shifting the sleeves as held by the jacks in the fittings to bring them into alignment.

The annular spaces between the sleeves and their respective fittings are dammed at the ends. If pour holes and holes for the release of entrained liquid have not been drilled to the annular passages in the fittings, these are now drilled. A high strength casting material, preferably P.R.S. no. 2419 High Strength Casting Resin, obtainable from Products Research Services, Inc., of Belle Chaise, La., and having a composition as follows:

Mixture 1. epoxy resin 140 parts by weight, titanium dioxide 45 parts, silica flour (325 mesh) 30 parts, silica sand (80–120 mesh) 200 parts, and Mixture 2. organic amido-amine (liquid) 49 parts, Black iron oxide 5 parts.

The two mixtures are blended prior to casting and have a working life of 45 minutes after blending. The blend is poured into the annular passages through the pour holes to completely fill the spaces between the bearing sleeves and the fittings in which they are held. The blend or casting hardens in 12 – 16 hours. When this time has elapsed, the jacks or other supports can be removed or cut off as close to the sleeves as convenient. The casting material binds the sleeves into the fittings in permanently oriented alignment. The maximum strength of the casting material is reached in 1 week to 10 days at ambient temperatures. The time is accelerated by heat, that is increases of 15° fahrenheit halves the period for reaching maximum strength for every 15° rise. The total heat should not exceed 300° however.

To ensure against all possible slippage between the casting and adjacent surfaces, such surfaces may be roughened, corrugated or indented before the casting is poured. Also the sleeve may define exterior walls that are other than round.

What is claimed is:

1. Method of aligning bearings in a shafting system comprising the following steps:

fixing support fixtures to a base structure in approximate alignment, said fixtures each defining a passageway therethrough;

movably supporting bearing sleeves adapted to fit loosely in said passageways with spaces therebetween by temporary supports;

aligning said sleeves in said passageways with associated sleeves;

fixing said sleeves in said respective fixtures in alignment by filling said spaces therebetween with high strength casting material.

removing said temporary supports after said casting has hardened.

2. Method of aligning bearings as described in claim 1 wherein aligning said bearing sleeves comprise the following steps:

mounting bearings in sleeve;

installing drive shaft in bearings;

instrumenting the bearings to read the static load condition in each of the bearings of the system;

adjusting sleeves on temporary supporting means in accordance with the instrument readings until said readings are in accord with the design data.

* * * * *